Feb. 2, 1960 F. HOCH 2,923,044
HOOK-AND-EYE CLOSING MEANS FOR THE WAISTBANDS
OF TROUSERS OR THE LIKE
Filed Sept. 26, 1956 3 Sheets-Sheet 1
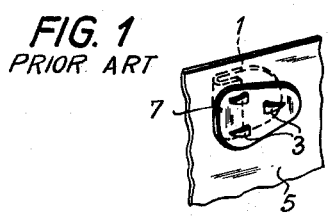
FIG. 1 PRIOR ART
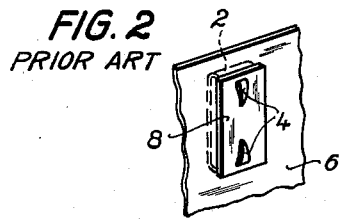
FIG. 2 PRIOR ART
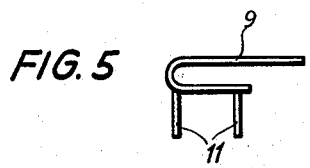
FIG. 5
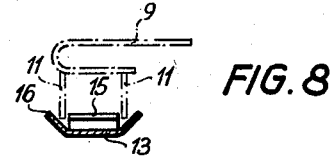
FIG. 8
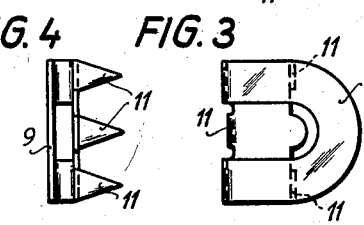
FIG. 4  FIG. 3  FIG. 6
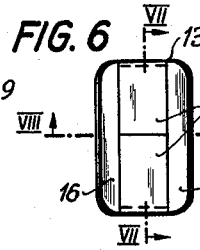
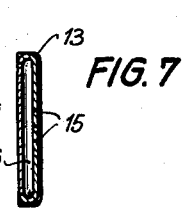
FIG. 7
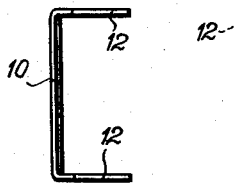
FIG. 10  FIG. 9
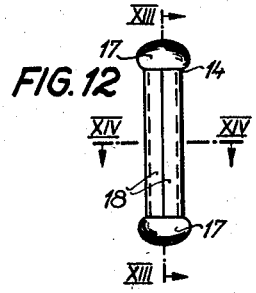
FIG. 12
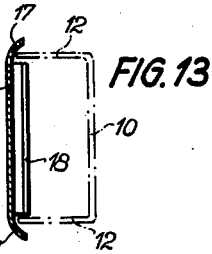
FIG. 13
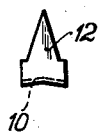
FIG. 11
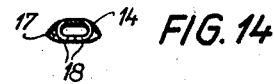
FIG. 14
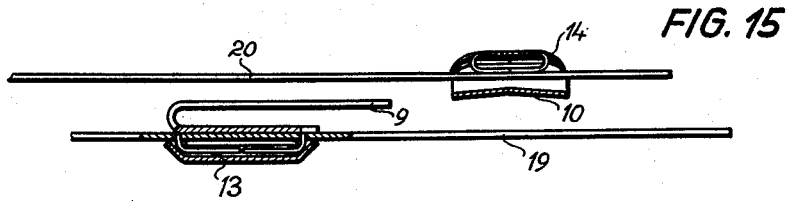
FIG. 15
INVENTOR
Fritz Hoch
by: Michael S. Striker
agt.

Feb. 2, 1960 F. HOCH 2,923,044
HOOK-AND-EYE CLOSING MEANS FOR THE WAISTBANDS
OF TROUSERS OR THE LIKE
Filed Sept. 26, 1956 3 Sheets-Sheet 2
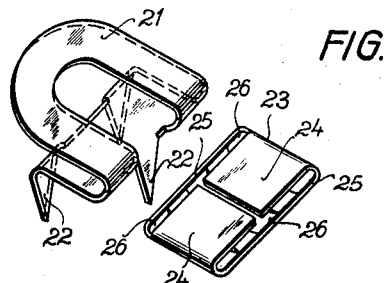
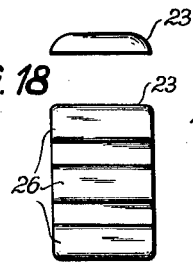
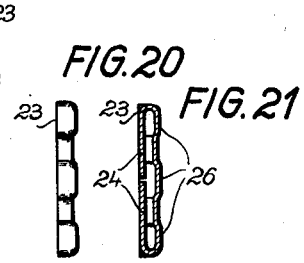
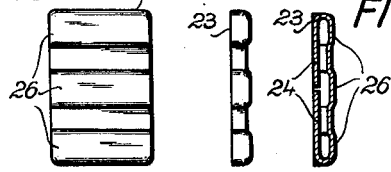
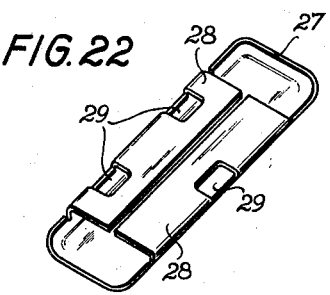
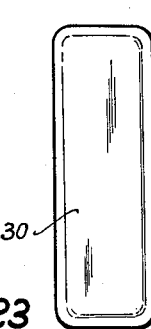
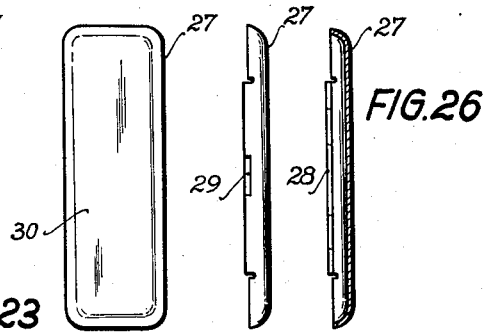
INVENTOR
Fritz Hoch
by:
Michael S. Striker
agt Feb. 2, 1960 F. HOCH 2,923,044
HOOK-AND-EYE CLOSING MEANS FOR THE WAISTBANDS
OF TROUSERS OR THE LIKE
Filed Sept. 26, 1956 3 Sheets-Sheet 3
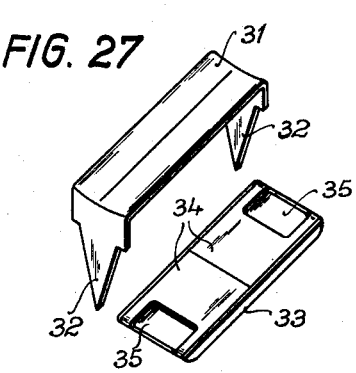
FIG. 27
FIG. 28
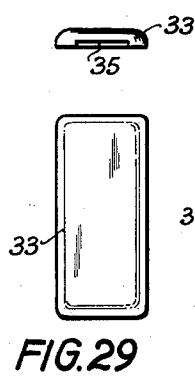
FIG. 30
FIG. 29
FIG. 31
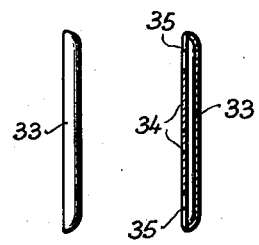
FIG. 32
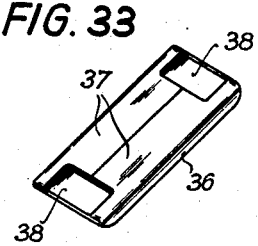
FIG. 33
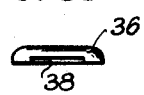
FIG. 35
FIG. 34 FIG. 36
FIG. 37
INVENTOR
Fritz Hoch
by:
Michael S. Striker
Agt.

United States Patent Office 2,923,044
Patented Feb. 2, 1960

2,923,044

HOOK-AND-EYE CLOSING MEANS FOR THE WAISTBANDS OF TROUSERS OR THE LIKE

Fritz Hoch, Pforzheim, Germany, assignor to Gutos Metallschliessen-Fabrik Bader & Hoch Kommanditgesellschaft Application September 26, 1956, Serial No. 612,261

Claims priority, application Germany October 22, 1955

12 Claims. (Cl. 24—227)

The present invention relates to novel hook-and-eye closing means for the waistbands of trousers or the like.

It is already known to the art to provide the hook-and-eye parts resting against the underlying support, that is to say, against the textile material of the trousers, with catches which, after having been pushed through the material, are pressed down against counter-plates or counter-supports, whereby through simple riveting of the catches of the hook-and-eye parts a connection to the waistband is obtained. However, in this known manner of fastening the hook-and-eye parts to the waistband, the catches pressed down against the counter-plates must subsequently be covered up by a lining in order to avoid injurious effects. Furthermore, in many cases it will be necessary to fasten the hook-and-eye parts to the already ready-made waistband of the trousers.

The hook-and-eye closing means of the invention are characterized in that the counter-supports or counter-parts for the hook-and-eye parts are of double-walled formation and provided with a hollow compartment between the two walls for the insertion thereinto of the catches of the hook-and-eye parts, whereby the counter-part is preferably so devised that its wall-part facing the hook-part or eye-part is of somewhat narrower width than the other wall-part in conformity with the distance of the catches of the hook- or eye-part from each other. The result of this is a smooth rear surface of the counter-part, as the catches are covered up and concealed from view, so that the hook-parts and eye-parts can be applied also to the ready-made waistbands of trousers.

More particularly, the counter-support or counter parts for the hook may consist of a longitudinally open box-like body having portions of its body project beyond and extend along its longitudinally open sides in inclined direction toward said open sides, enabling in this way a reliable riveting and perfect covering up of the prongs or catches by means of which the riveting is effected. In conformity herewith, the counter-part for the eye-part may consist of a transversely open box-like body having portions of its body extending along its transversely open sides in inclined direction toward said open sides.

According to another feature of the invention, an improved guidance for the prongs or catches of the hook-part or eye-part is obtained by provision of the respective counter-parts with guide grooves extending into the box-like interior of the counter-parts for the prongs or catches to engage in and to be guided in.

It is further possible to provide the box-like body of the counter-parts for the hook-part and eye-part in the wall facing the hook-part or eye-part with special openings for the individual prongs or catches of the hook-part or eye-part to engage in, instead of providing the counter-parts simply with longitudinally or transversely open sides or slots.

Additional features and advantages of the invention will be understood from a consideration of the following detailed description taken in connection with the accompanying drawings forming a part of this specification and in which several embodiments of the invention have been shown by way of example. However, I wish to say that the invention is not confined to any strict conformity with the showing of the drawings but may be changed or modified, so long as such changes or modifications mark no material departure from the salient features of the invention as expressed in the appending claims.

In the drawings

Figs. 1 and 2 are perspective views of known hook-and-eye closing means;

Figs. 3 to 5 are a top-view and side views, respectively, of a hook-part of the first form of construction;

Figs. 6 to 8 are a top-view, a central longitudinal section, and a cross-section, respectively, of the counter-part for the form of construction of Figs. 3 to 5;

Figs. 9 to 11 are a top-view and side views, respectively, of an eye-part of the first form of construction;

Figs. 12 to 14 are a top-view, central longitudinal section, and a cross-section of the counter-part for the form of construction of Figs. 9 to 11;

Fig. 15 is a sectional view, on an enlarged scale, through the waistband provided with the hook-and-eye closing means of the first form of construction;

Figs. 16 and 17 are a perspective view of a hook-part and counter-part of a second form of construction;

Figs. 18 to 21 are a top-view, side views, and a central longitudinal section, respectively, of the counter-part of Fig. 17;

Fig. 22 is a perspective view of the counter-part for the hook in the third form of construction;

Figs. 23 to 26 are a top-view, side views, and a central longitudinal section, respectively, of the counter-part of Fig. 22;

Figs. 27 and 28 are perspective views of an eye-part and counter part of a fourth form of construction;

Figs. 29 to 32 are a top-view, two side views, and a central longitudinal section, respectively, of the counter-part of Fig. 28;

Fig. 33 is a perspective view of a counter-part for the eye-part of a fifth form of construction;

Figs. 34 to 37 are a top-view, two side-views, and a central longitudinal section, respectively, of the counter-part of Fig. 33.

In known hook-and-eye closing means, as illustrated in Figs. 1 and 2, the hook-part or eye-part resting on the textile material is provided with catches 3 or 4, which are pushed through the material 5 or 6 and then folded down against counter-plates 7 or 8. These catches 3 or 4 which on the back of the counter-plates are freely exposed, must then be covered up by a lining (not illustrated in the drawings) in order to prevent them from causing injurious effects. This subsequent covering up of the catches with a lining is for the hook-and-eye closing means of the invention no longer necessary.

In the first embodiment of the invention, the hook-part 9 as well as the eye-part 10 are provided on the side facing the material with catches 11 or 12, while the counter-supports consist of hollow counter-parts 13 or 14. The double-layer or double-walled hollow counter-part 13 for the hook-part is bent from a stamped-out blank provided with long transverse flaps 15 and narrow longitudinal flaps 16 in such manner that the transverse flaps 15 form the hollow compartment, while the longitudinal flaps 16 bent upwardly along the open sides or slots of the hollow compartment form the guide flaps for the catches 11 of the hook-part 9 during the fastening or riveting action. The double-walled hollow counter-part 14 for the eye-part is bent from a stamped-out blank provided with short transverse flaps 17 and narrow longitudinal flaps 18 in such manner that the longitudinal flaps 18 form the hollow compartment, while the transverse flaps 17 at the open ends of the hollow compartment form the guide flaps for the catches 12 of the eye-part 10 during the fastening or riveting action.

Figs. 8 and 13 show, partly in dot-and-dash lines, the position of the hook-part or eye-part, respectively (of the first embodiment), prior to the fastening or riveting action, while Fig. 15 shows the hook-part or eye-part, respectively, fastened through riveting to the waistband of the trousers. It will be seen, therefore, that through the use of the hook-and-eye-parts of the invention smooth rear surfaces are obtained, so that the riveting can be done at the ready-made waistband without the necessity of subsequent lining.

In the second form of construction, Fig. 16 shows a hook-part 21 provided with catches 22 and corresponding substantially to the hook-part of the first embodiment. The counter-part for the hook-part, illustrated in Figs. 17 to 21, consists, similar to the counter-part of the first embodiment, of a hollow counter-plate 23 formed from a stamped-out blank provided wtih transverse flaps 24 through folding of the flaps 24, whereby inclined slots 25 are left open for the insertion of the catches 22. In this form of construction the counterpart 23 is provided with guide grooves 26 extending in the direction of the entering catches 22 and facilitating the orderly riveting.

In the third form of construction, the hook-part 21 with catches 22, as illustrated in Fig. 16, is likewise employed. The counter-support for the hook-part consists of the counter-part 27 (see Figs. 22 to 26) formed from a stamped-out blank, provided with longitudinal flaps 28, through folding down of the flaps. The longitudinal flaps are provided with openings 29 for the insertion thereinto of the catches 22, so that reliable riveting is guaranteed. In this form of construction the outer surface 30 of the counter-part may serve as ornamental plate. This is desirable particularly for those counter-parts of this type which are applied to the ready-made waistband, as they remain visible on the outside of the extension of the waistband after the waistband has been closed.

It is further possible to employ the counter-parts, as described in the second and third embodiment for the fastening of the hook-part, also for the fastening of the eye-part, as will be described hereafter.

The fourth embodiment shows in Fig. 27 an eye-part 31 provided with catches 32, corresponding to that of the first embodiment. The counter-part as per Figs. 28 to 32, consists of a hollow eye-counter-part 33 formed from a stamped-out blank through inward folding of the transverse flaps 33. Provided in these transverse flaps are the openings 35 for the insertion thereinto of the catches 32, whereby a reliable riveted connection is obtained.

The fifth form of construction employs again the eye-part 31 with catches 32, as shown in Fig. 27. The counter-part, illustrated in Figs. 33 to 37, consists of the hollow hook-counter-plate 36 formed from a stamped-out blank and provided with longitudinal flaps 37. In these flaps 37 are the openings 38 for the insertion thereinto of the catches 32, so that a reliable riveted connection is guaranteed.

What I claim as new and desire to secure by Letters Patent of the United States is:

1. Two-piece fastener element combination, attachable to one or more layers of material, comprising, in combination, one fastener element including a service portion having surface elements defining a plane of contact with said material when attached thereto and a plurality of integral attaching flat prongs projecting substantially parallel with each other from opposite edges of said service portion and substantially perpendicular to said plane away from said service portion, said prongs being spaced from each other a predetermined distance in a direction transverse to said edges; and a flat hollow box-like counter-element having a planar first wall portion and a second planar wall portion substantially parallel with, and closely spaced from, said first wall portion a distance corresponding to the thickness of said prongs, and at least two side walls opposite each other and connecting said first and second wall portions, said second wall portion having an outer surface constituting the plane of contact with said material when said combination is attached thereto, and having edge portions parallel with each other and spaced from each other corresponding to said predetermined distance of spacing existing between said prongs of the cooperating fastener element, said first wall portion extending beyond said edge portions of said second wall portion at an angle towards the latter so as to form adjacent to each of said edge portions a guide pocket, so that the two-piece fastener element combination can be assembled and at the same time attached to said material by forcing said prongs of said fastener element through said material and into said guide pockets of said counter-element whereby said prongs are forced to bend towards each other to extend in a single plane parallel to and between said planar first and second wall portions so that said counter element has a thickness substantially corresponding to the total thickness of said first and second wall portions and of said prongs.

2. Two-piece fastener element combination as set forth in claim 1, wherein said second wall portion of said counter-element substantially consists of two flaps respectively extending towards each other from two of said opposite side walls.

3. Two-piece fastener element combination as set forth in claim 2, wherein said edge portions of said second wall portion are constituted, respectively, by an edge of cutouts provided in said flaps and spaced from each other corresponding to the relative spacing of said prongs.

4. Two-piece fastener element combination as set forth in claim 3, wherein said flaps have free ends substantially meeting each other along a center line of said counter-element parallel with its said side walls from which said flaps extend, and wherein said edge of said cutouts in said flaps, respectively, extends parallel with said center line.

5. Two-piece fastener element combination as set forth in claim 3 wherein said flaps have free ends substantially meeting each other along a center line of said counter-element parallel with its side walls from which said flaps extend, and wherein said edge of said cutouts in said flaps, respectively, extends transverse to said center line.

6. Two-piece fastener element combination as set forth in claim 1, wherein said first wall portion of said counter-element is provided on its inner face with guide grooves corresponding in number and relative spacing to the number and transverse spacing of said prongs of said fastener element, said grooves extending in a direction transverse to said edge portion of said second wall portion.

7. The two-piece fastener element combination according to claim 1, wherein said service portion has an intermediate portion so formed as to present a surface extending in said plane for contact with said material.

8. The two-piece fastener element combination according to claim 1, wherein said service portion has an intermediate portion and end portions so formed as to present a pair of shoulder faces associated with each of said flat prongs providing surfaces in said plane for contact with said material.

9. A fastener element formed from a single piece of flat material including a flat body portion of substantially rectangular shape and having a surface defining a plane of contact with said material when attached thereto, at least one forward flat prong integral with said body portion and extending from one side of said rectangular shape and in a plane substantially perpendicular to the plane of said body portion, a rearward single flat prong integral with said body portion and extending from the opposite side of said rectangular shape in a plane substantially parallel to the plane of said pair of prongs, and a U-shaped flat portion extending in a plane substantially parallel to the plane of said body portion and spaced therefrom in a direction opposite to that of the prongs, the shanks of said U-shaped portion having end portions integrally connecting them to said body portion at the ends of said opposite side of said rectangular shape substantially straddling said third prong, whereby said U-shaped portion with said body portion and said connecting portions constitutes a hook; and a second fastener element forming a hollow box-like counter-element having a first wall portion and a second wall portion substantially parallel with and spaced from said first wall portion a distance substantially corresponding to the thickness of said prongs, and at least two side walls opposite each other and connecting said first and second wall portions, said second wall portion having an outer surface constituting a plane of contact with said material when said combination is attached thereto, and having edge portions parallel with each other and spaced from each other corresponding to the spacing between said forward and rearward prongs of the first fastener element, said first wall portion extending beyond said edge portions of said second wall portion at an angle towards the latter so as to form adjacent to each of said edge portions a guide pocket, so that the two-piece fastener element combination can be assembled and at the same time attached to said material by forcing said prongs of said first fastener element through said material and into said guide pockets of said counter-element whereby said prongs are forced to bend towards each other around said parallel edge portions of said second wall portion to extend in a single plane parallel to and between said planar first and second wall portions so that said counter-element has a thickness substantially corresponding to the total thickness of said first and second wall portions and of said prongs.

10. A two-piece fastener attachable to one or more layers of material comprising, in combination, a first fastener element formed from a single piece of flat material including a flat body portion of substantially rectangular shape and having a surface defining a plane of contact with said material when attached thereto, a pair of forward flat prongs integral with said body portion and extending from one side of said rectangular shape at respective ends thereof and in a plane substantially perpendicular to the plane of said body portion, a rearward single flat prong integral with said body portion and extending from the opposite side of said rectangular shape in a plane substantially parallel to the plane of said pair of prongs, and a U-shaped flat portion extending in a plane substantially parallel to the plane of said body portion and spaced therefrom in a direction opposite to that of the prongs, the shanks of said U-shaped portion having end portions integrally connecting them to said body portion at the ends of said opposite side of said rectangular shape substantially straddling said third prong, whereby said U-shaped portion with said body portion and said connecting portions constitutes a hook; and a second fastener element forming a hollow box-like counter element having a first wall portion and a second wall portion substantially parallel with, and spaced from, said first wall portion a distance corresponding to the thickness of said prongs, and at least two side walls opposite each other and connecting said first and second wall portions, said second wall portion having an outer surface constituting a plane of contact with said material when said combination is attached thereto, and having edge portions parallel with each other and spaced from each other corresponding to the spacing between said forward and rearward prongs of the first fastener element, said first wall portion extending beyond said edge portions of said second wall portion at an angle towards the latter so as to form adjacent to each of said edge portions a guide pocket, so that the two-piece fastener element combination can be assembled and at the same time attached to said material by forcing said prongs of said first fastener element through said material and into said guide pockets of said counter-element whereby said prongs are forced to bend towards each other around said parallel edge portions of said second wall portion and to anchor themselves inside said counter-element underneath said second wall portion thereof.

11. A two-piece fastener element combination attachable to one or more layers of material comprising, in combination, a first fastener element formed from a single piece of flat material including a flat body portion of substantially rectangular shape and having a surface defining a plane of contact with said material when attached thereto, a pair of flat forward prongs integral with said body portion and extending from one side of said rectangular shape at respective ends thereof and in a plane substantially perpendicular to the plane of said body portion, a rearward single flat prong integral with said body portion and extending from the opposite side of said rectangular shape in a plane substantially parallel to the plane of said pair of prongs, and a U-shaped flat portion extending in a plane substantially parallel to the plane of said body portion and spaced therefrom in a direction opposite to that of the prongs, the shanks of said U-shaped portion having end portions integrally connecting them to said body portion at the ends of said opposite side of said rectangular shape substantially straddling said third prong, whereby said U-shaped portion with said body portion and said connecting portions constitutes a hook; and one hollow box-like counter-element having a first wall portion and a second wall portion substantially parallel with and spaced from said first wall portion a distance corresponding to the thickness of said prongs, and at least two side walls opposite each other and connecting said first and second wall portions, said second wall portion having an outer surface constituting a plane of contact with said material when said combination is attached thereto, said second wall portion consisting of two flaps extending towards each other from two of said opposite side walls and having cutouts spaced from each other corresponding to the spacing of said prongs relative to one another and providing parallel edge portions spaced from each other corresponding to the spacing between said forward and rearward prongs, said first wall portion extending beyond said edge portions of said second wall portion at an angle towards the latter so as to form adjacent to each of said edge portions a guide pocket, so that the two-piece fastener element combination can be assembled and at the same time attached to said material by forcing said prongs of said first fastener element through said material and into said guide pockets of said counter-element whereby said prongs are forced to bend towards each other around said parallel edge portions of said second wall portion and to anchor themselves inside said counter-element underneath said second wall portion thereof.

12. A two-piece fastener element combination, attachable to one or more layers of material comprising, in combination, a first fastener element formed from a single piece of flat material including a flat body portion of substantially rectangular shape having a pair of parallel sides, a pair of forward flat prongs integral with said body portion and extending from one side of said rectangular shape at respective ends thereof and in a plane substantially perpendicular to the plane of said body portion, a rearward single flat prong integral with said body portion and extending from the opposite side of said rectangular shape in a plane substantially parallel to the plane of said pair of prongs, and a U-shaped flat portion extending in a plane substantially parallel to the plane of said body portion and spaced therefrom in a direction opposite to that of the prongs, the shanks of said U-shaped portion having end portions integrally connecting them to said body portion at the ends of said opposite side of said rectangular shape substantially straddling said third prong, whereby said U-shaped portion with said body portion and said connecting portions constitutes a hook; and one hollow box-like counter-element having a first wall portion and a second wall portion substantially parallel with, and spaced from, said first wall portion a distance corresponding to the thickness of said prongs, said first wall portion being corrugated so as to form on its inner face guide grooves corresponding in number and relative spacing to the number and transverse spacing of said prongs, said grooves extending in a direction transverse to said edge portion of said second wall portion, and at least two side walls opposite each other and connecting said first and second wall portions, said second wall portion having an outer surface constituting a plane of contact with said material when said combination is attached thereto, said second wall portions consisting of two flaps extending toward each other from two of said opposite side walls, and having edge portions parallel with each other and spaced from each other corresponding to the spacing existing between said forward and rearward prongs of the first fastener element, said first wall portion extending beyond said edge portions of said second wall portion at an angle towards the latter so as to form adjacent to each of said edge portions a guide pocket, so that the two-piece fastener element combination can be assembled and at the same time attached to said material by forcing said prongs of said first fastener element through said material and into said guide pockets of said counter-element whereby said prongs are forced to bend towards each other around said parallel edge portions of said second wall portion and to anchor themselves inside said counter-element underneath said second wall portion thereof.

References Cited in the file of this patent

UNITED STATES PATENTS

| | | |
|---|---|---|
| 537,189 | Franke | Apr. 9, 1895 |
| 623,434 | Shipley | Apr. 18, 1899 |
| 642,040 | Griffith | Jan. 23, 1900 |
| 1,243,319 | McLaughlin | Oct. 16, 1917 |
| 1,899,680 | Ford | Feb. 28, 1933 |
| 2,703,915 | Markin | Mar. 15, 1955 |

FOREIGN PATENTS

| | | |
|---|---|---|
| 78,260 | Switzerland | July 1, 1918 |